(12) United States Patent
Cloft et al.

(10) Patent No.: US 7,708,230 B2
(45) Date of Patent: May 4, 2010

(54) FLOW DISTRIBUTION SYSTEM FOR INLET FLOW CONTROL

(75) Inventors: Thomas G. Cloft, Glastonbury, CT (US); Sarah M. Wall, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 359 days.

(21) Appl. No.: 11/754,561

(22) Filed: May 29, 2007

(65) Prior Publication Data

US 2008/0296440 A1    Dec. 4, 2008

(51) Int. Cl.
B64C 21/04 (2006.01)

(52) U.S. Cl. .................................. 244/207

(58) Field of Classification Search ............ 244/204, 244/130, 207
See application file for complete search history.

(56) References Cited

U.S. PATENT DOCUMENTS

| | | | |
|---|---|---|---|
| 3,981,466 A * | 9/1976 | Shah | 244/134 R |
| 4,154,256 A * | 5/1979 | Miller | 137/15.1 |
| 4,658,579 A | 4/1987 | Bower et al. | |
| 4,674,714 A * | 6/1987 | Cole et al. | 244/134 B |
| 4,738,416 A * | 4/1988 | Birbragher | 244/134 B |
| 4,749,151 A * | 6/1988 | Ball et al. | 244/53 B |
| 4,993,663 A | 2/1991 | Lahti et al. | |
| 5,114,103 A | 5/1992 | Coffinberry | |
| 5,447,283 A * | 9/1995 | Tindell | 244/207 |
| 5,485,975 A * | 1/1996 | Tindell | 244/53 B |
| 5,490,644 A | 2/1996 | Koncsek et al. | |
| 5,593,112 A | 1/1997 | Maier et al. | |
| 6,179,251 B1 * | 1/2001 | Tindell et al. | 244/207 |
| 6,264,137 B1 | 7/2001 | Sheoran | |
| 6,438,941 B1 | 8/2002 | Elliott et al. | |
| 6,634,595 B2 | 10/2003 | Koncsek et al. | |
| 6,651,929 B2 | 11/2003 | Dionne | |
| 6,708,711 B2 | 3/2004 | Surply et al. | |
| 6,851,255 B2 | 2/2005 | Aitchison et al. | |
| 6,945,031 B2 | 9/2005 | Lair | |

* cited by examiner

*Primary Examiner*—Tien Dinh
(74) *Attorney, Agent, or Firm*—Carlson, Gaskey & Olds

(57) ABSTRACT

A nacelle structure for a gas turbine engine includes an inlet aft of an exit guide vane for supplying air flow to a forward plenum. Air is exhausted from the plenum into an air intake opening and over an inner surface of the nacelle for controlling air flow characteristics within the nacelle.

18 Claims, 4 Drawing Sheets

FLOW DISTRIBUTION SYSTEM FOR INLET FLOW CONTROL

BACKGROUND OF THE INVENTION

This invention generally relates to a nacelle structure for a gas turbine engine.

A nacelle defines an inlet for air flow into a gas turbine engine. During most operating conditions air flow along the interior surface of the nacelle is turbulent resulting in a thin boundary layer. This turbulent airflow within this thin boundary layer into the gas turbine engine provides desired operating performance. In some operating conditions, such as during low speed, high power operation, local flow fields result in an increased boundary layer thickness that can separate from the interior surface of the nacelle. Separation of air flow from the interior surface of the nacelle is not desirable and can result in a reduction in engine operating performance.

Accordingly, it is desirable to design and develop a nacelle with features to create and maintain desired air flow characteristics through the nacelle.

SUMMARY OF THE INVENTION

A disclosed example nacelle includes an inlet flow control system that injects air into the into a nacelle air intake opening to control intake air flow.

An example nacelle assembly includes an outer surface, an inner surface and an air intake opening. An inlet duct is disposed within the nacelle aft of exit guide vanes for drawing air into a passage disposed within the nacelle. Air drawn from aft of the exit guide vanes is communicated through a plurality of passages to a plurality of outlets proximate the air intake opening of the nacelle. Air is communicated through the outlets into the air intake opening into the nacelle assembly. The additional air flow into the nacelle intake provides control of air flow to maintain the desired turbulent flow with a desired relatively thin boundary layer and prevent separation of airflow from the inner surface of the nacelle assembly.

Accordingly, the example nacelle assembly improves and maintains air flow characteristics along the inner surface of the nacelle assembly in order to provide the desired operation of the gas turbine engine assembly.

These and other features of the present invention can be best understood from the following specification and drawings, the following of which is a brief description.

DETAILED DESCRIPTION OF THE PREFERRED EMBODIMENT

Figure 1:
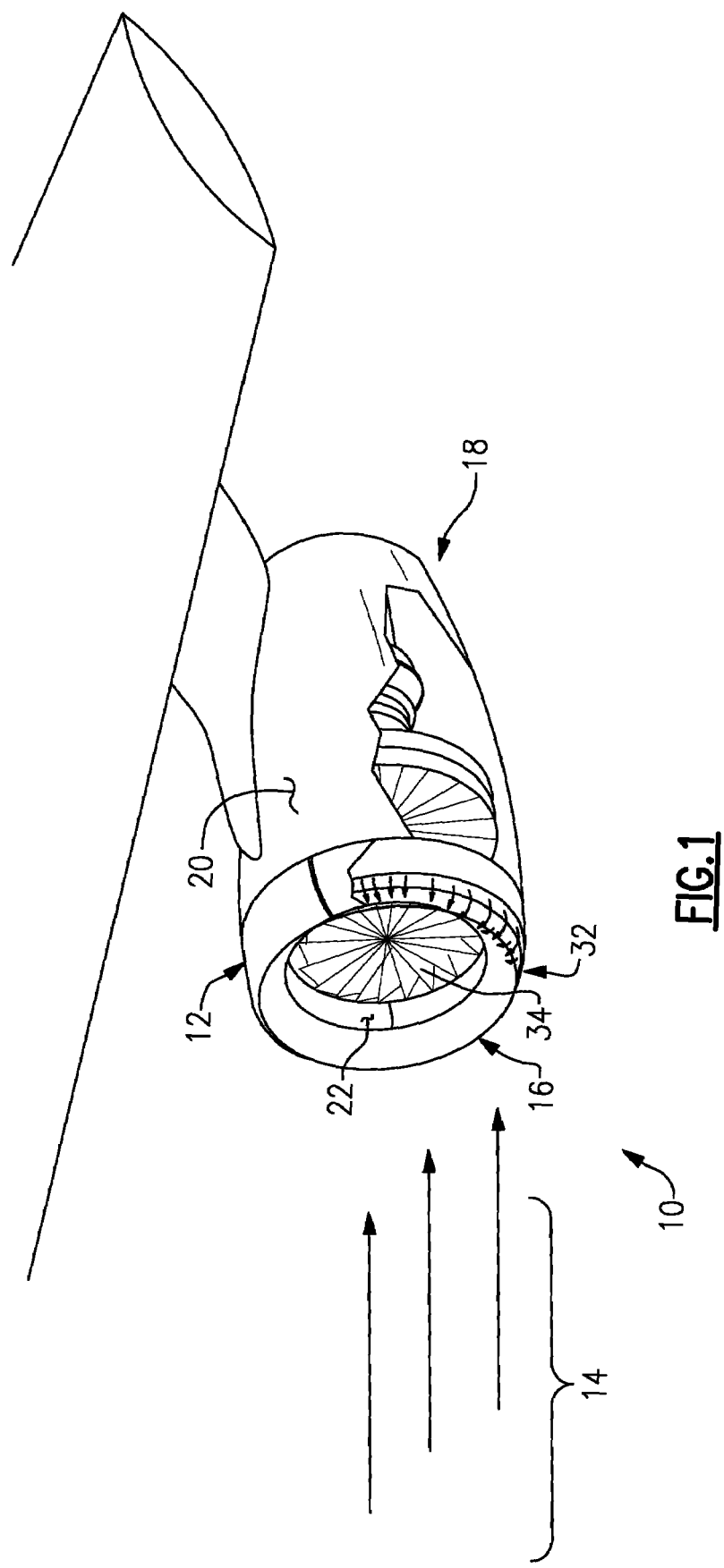
FIG. 1 is a perspective view of a gas turbine engine assembly housed within a nacelle.

Referring to FIG. 1, an example gas turbine engine assembly 10 is housed within a nacelle 12. The nacelle 12 includes an intake opening 16, a trailing edge 18, an inner surface 22, and an outer surface 20. Airflow schematically indicated at 14 is directed into the gas turbine engine assembly 10 through the intake opening 16 of the nacelle 12. During most operating conditions, incoming air into the nacelle 12 flows along the inner surface 22. This airflow condition is such that the air is uniformly directed into the fan blades 34 of the gas turbine engine 10.

However, during some operating conditions, such as when the aircraft is moving at a relatively slow speed and the engine is operating at a relatively high power output, more airflow than is capable of being efficiently provided is required. In such instances, outlets 32 provided added airflow to the intake opening 16 that increases the airflow velocity. The increased velocity airflow reduces thickness of the boundary layer to substantially preventing separation of air flow from the inner surfaces of the nacelle 12. Separation from the inner surface of the nacelle 12 can result in undesirable intake air flow which can affect engine performance.

The example nacelle assembly 12 includes an inlet flow control system that controls and adds inlet air flow into the nacelle assembly 12. The inlet flow control system includes the outlets 32 through which air is injected into the nacelle 12.

Figure 2:
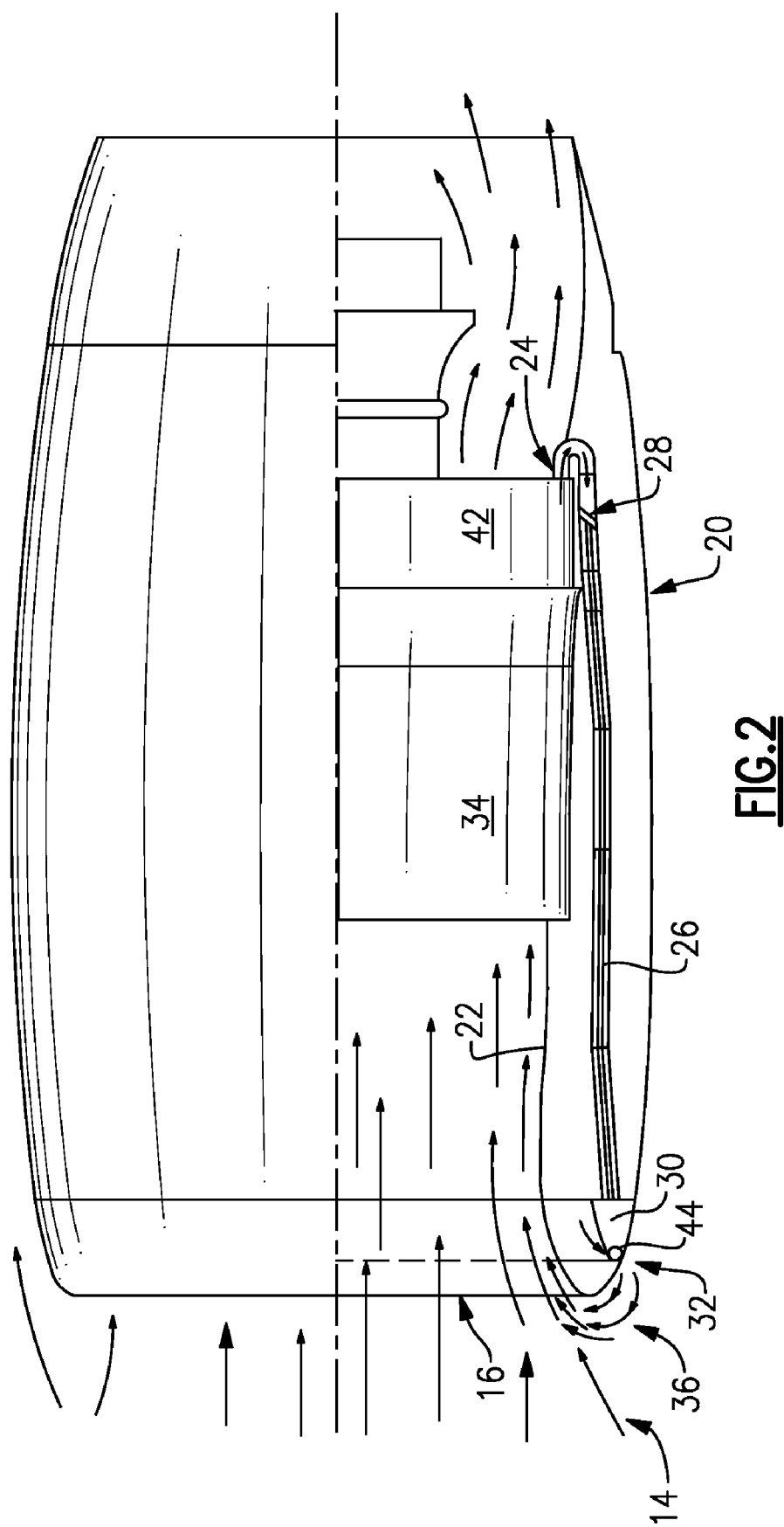
FIG. 2 is a cut away view of the example nacelle assembly including the example inlet control system.

Referring to FIG. 2, the nacelle assembly 12 includes the inner surface 22 that is spaced radially inward from the outer surface 20. Inlet air 14 flows along the outer surface 20 and the inner surface 22. During operation where additional airflow is desired to stabilize air flow along the inner surface 22, the inlet flow control system provides air from a position aft of an exit guide vane 42 to the intake opening 16.

The example inlet flow control system includes an integrally formed inlet passage 24 that is disposed aft of the exit guide vane 42 of the intake fan 34. The inlets 24 feed a plurality of separate passages 26 that direct air to a plenum 30. The plenum 30 is disposed substantially adjacent to the intake opening 16 of the nacelle assembly 12. The plurality of outlets 32 are disposed in communication with the plenum 30 and supply air flow 36 proximate the intake opening 16. The example outlets 32 each include a flow control device that governs air flow out of the plenum 30. In the example, the flow control device comprises an orifice 44 sized to provide a desired air flow at a given pressure. Additionally, other flow control devices such as selectively controlled valves could also be utilized for controlling air flow from the plenum 30.

The additional air flow 36 from the plenum 30 provides for conditioning of air that flows within the nacelle 12. The additional air flow 36 is directed across the outer surface 20 over the intake opening 16 and into the intake of the nacelle 12. This additional air flow 36 maintains desired air flow characteristics along the inner surface 22 of the nacelle 12.

A control valve 28 is included in each of the plurality of passages 26 to control airflow to the outlets 32. In instances where air flow 14 provides sufficient air to maintain the desired flow properties along the inner surface 22, the control valves 28 are closed such that the additional air flow 36 is not directed to the plenum 30 and outlets 32. When additional air flow is required the valves 28 can be opened to direct the desired air flow. Further, the control valves 28 can be proportionally opened to tailor the amount of air flow 36 emitted from the outlets 32 according to current operational requirements.

Figure 3:
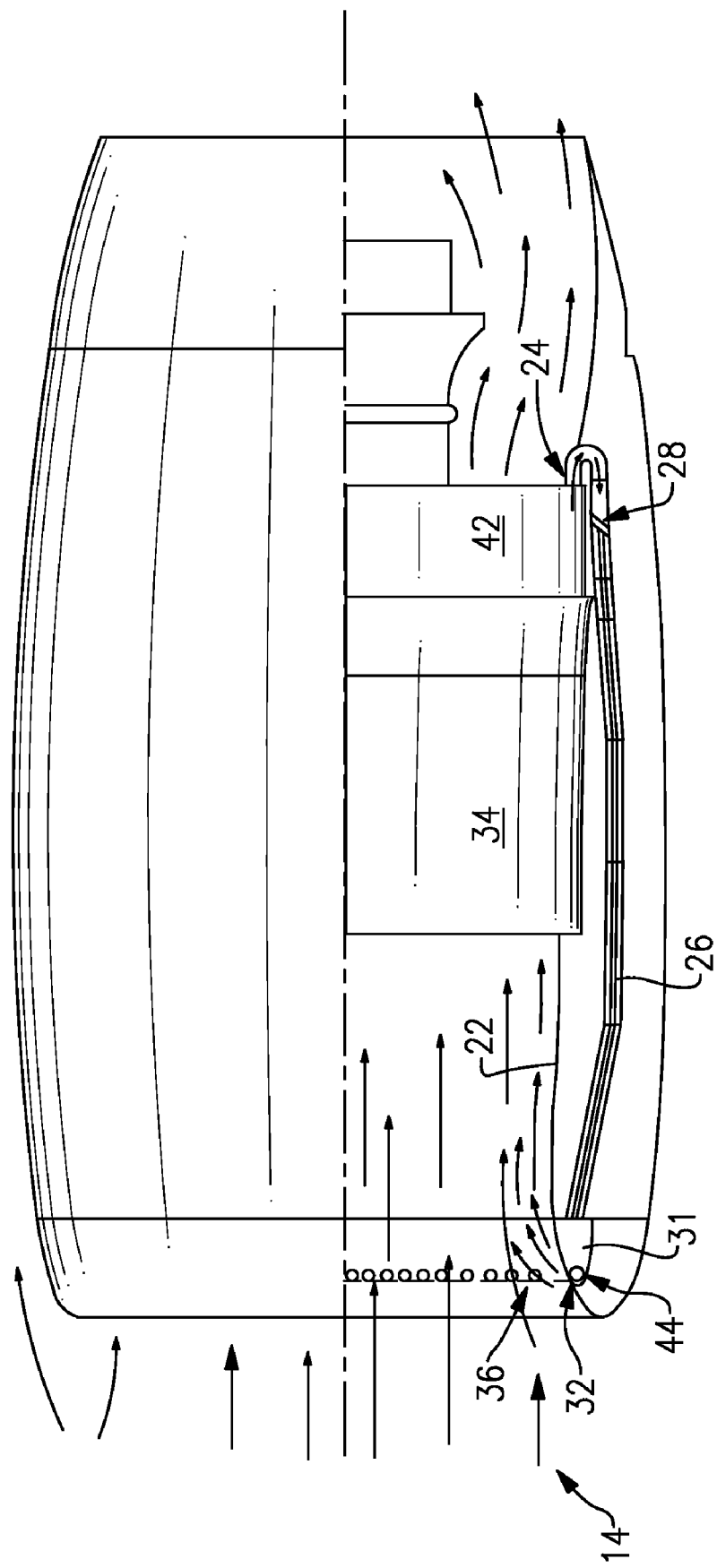
FIG. 3 is a cut away view of another example nacelle assembly including another example inlet control system.

Referring to FIG. 3, another example nacelle includes the inlet 32 disposed to inject air along the inner surface 22. The example plenum 31 is disposed to supply airflow to the inlets 30 disposed near the intake opening 16 that are defined within the inner surface 22. In this example, airflow 36 from the array of openings 32 arranged along the inner surface 22 adds air directly into the inlet of the nacelle 12.

Figure 4:
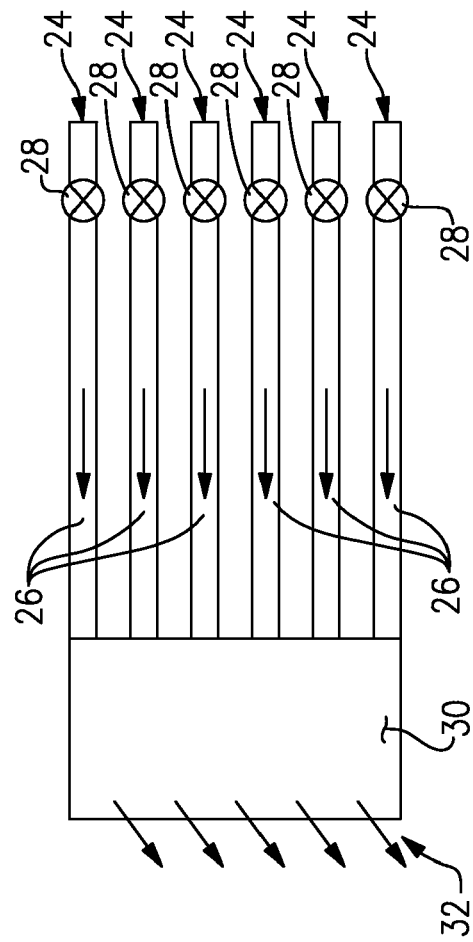
FIG. 4 is a schematic representation of the example inlet control assembly.
Figure 5:
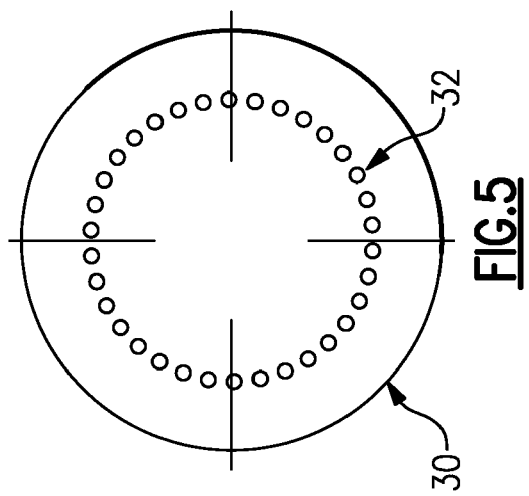
FIG. 5 is a front schematic representation of the plenum for the example air inlet control assembly.

Referring to FIGS. 4 and 5, the inlet flow control system is schematically shown and includes the plenum 30 disposed along a full circumference of the nacelle 12. The plenum 30 provides air flow through the outlets 32 that in turn provide additional air flow locally to improve and control inlet air flow.

The example passages 26 are separate from each other to provide the desired air flow from each corresponding inlet 24 to the plenum 30. Each of the passages 26 includes a separate and independently actuateable control valve 28. The separate control valves 28 can be selectively opened and closed to provide a desired air flow and pressure to the plenum 30. Further, a combination of the plurality of control valves 28 can be partially opened or closed in order to meter air flow as desired to the plenum 30.

Air within the plenum 30 is directed out through the plurality of outlets 32 as desired. The pressure and air flow within the plenum 30 governs the amount of air flow emitted through the outlets 32, and the control valves 28 control that air flow. During operation where no additional air flow is required, the valves 28 remain closed and the pressure within the plenum 30 will match that of the ambient environment. During operation, when additional air flow into the nacelle 12 is required, the control valves 28 are opened to tailor pressure within the plenum 30 as required to provide the desired air flow through the plurality of outlets 32. Pressure within the plenum 30 governs air flow 36 out the outlets 32, across the intake opening 16 and into the nacelle 12.

Figure 6:
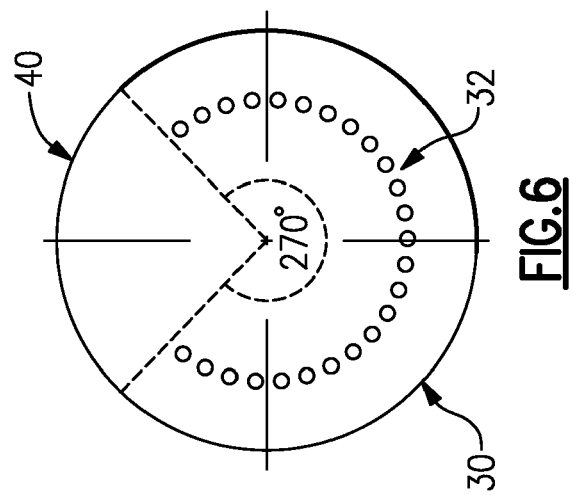
FIG. 6 is another front schematic representation of the plenum for the example air inlet control assembly.

Referring to FIG. 6, another example plenum 30 supplies air to outlets 32 disposed along less then the full circumference of the nacelle 12 to tailor injection of air along those portions of the inner surface 22. The example outlets 32 are disposed within an arc of 270° about the inner surface 22 to inject air along the lower portion of the nacelle 12. As appreciated, other arc angles are within the contemplation of this system to tailor injection air to desired operations. This provides the increased air in targeted areas that are most susceptible to increased boundary layer and separation. The targeted flow of air through the outlets provides efficient use of the additional air flow drawn from inlets 24.

Accordingly, the inlet flow control system of this invention provides additional air to maintain the desired air flow properties and stability along the inner surface of the nacelle 12. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An inlet flow control system for a nacelle comprising:
an air intake opening;
an inlet disposed in an aft portion of the nacelle for drawing in airflow;
a plenum disposed adjacent said air intake opening for receiving air flow from said inlet; and
an outlet disposed on an outer surface of the nacelle for communicating air flow from said plenum along the outside of the nacelle and into said air intake opening of the nacelle for tailoring airflow within said nacelle to current operating conditions.

2. The system as recited in claim 1, wherein said plenum comprises a cavity within the nacelle.

3. The system as recited in claim 1, wherein said outlet comprises a flow control device for governing air flow out onto the leading edge of the nacelle.

4. The system as recited in claim 1, including a plurality of separate inlets for drawing air into a corresponding plurality of passages, where each of the plurality of passages are in communication with said plenum.

5. The system as recited in claim 4, including a corresponding plurality of control valves for governing air flow from each of said plurality of inlets and said plenum.

6. The system as recited in claim 1, wherein said outlets are disposed about an entire circumference of the air intake opening.

7. The system as recited in claim 1, wherein said outlets are disposed about a partial portion of the air intake opening.

8. The system as recited in claim 1, wherein said outlet communicates air to an external surface of said nacelle.

9. The system as recited in claim 1, wherein said outlets communicate air to an internal surface of said nacelle.

10. A nacelle assembly for a gas turbine engine comprising:
an outer surface;
an inner surface defining an air flow path;
an intake opening disposed along said inner surface;
a plenum disposed within said nacelle assembly;
an outlet disposed on the outer surface that is in communication with said plenum for directing air flow along the outer surface and into said air intake opening onto said inner surface for controlling flow properties of intake air into said nacelle;
an inlet for supplying exhaust air flow to said plenum; and
a control valve for controlling air flow from said inlet to said plenum.

11. The assembly as recited in claim 10, wherein said plenum comprises a cavity disposed about a circumference of said nacelle.

12. The assembly as recited in claim 10, wherein said outlet comprises a plurality of outlets in said outer surface that are disposed at least partially about a circumference of said nacelle.

13. The assembly as recited in claim 10, wherein said outlet comprises a plurality of outlets in said inner surface that are disposed at least partially about a circumference of said nacelle.

14. The assembly as recited in claim 10, including a plurality of passages between said inlet and said plenum and a corresponding plurality of control valves for controlling air flow from said plurality of inlets to said plenum.

15. A nacelle assembly for a gas turbine engine comprising:
an outer surface;
an inner surface defining an air flow path;
an intake opening disposed along the inner surface;
a plenum disposed within said nacelle assembly;
an outlet in communication with said plenum for directing air flow into said air intake opening onto said inner surface for controlling flow properties of intake air into said nacelle:
an inlet for supplying exhaust air flow to said plenum, wherein said inlet is disposed aft of an exhaust guide vane of the gas turbine engine; and
a control valve for controlling air flow from said inlet to said plenum.

16. A method of controlling air flow through an intake of a nacelle assembly, said method comprising the steps of:
drawing air from an aft portion of the nacelle assembly through a plurality of separate passages;

receiving air flow from the plurality of passages into a cavity near an intake opening of the nacelle assembly; and injecting air through an opening on an outer surface of the nacelle into the intake opening of the nacelle assembly for tailoring airflow along an inner surface of the nacelle near the leading edge that flows over the leading edge and into the nacelle assembly.

17. The method as recited in claim 16 including the step of controlling the air flow through the passage with a control valve.

18. The method as recited in claim 17 including the step of selectively opening the control valve to control a pressure within the cavity.

* * * * *